United States Patent
Yagi et al.

(10) Patent No.: US 7,511,759 B2
(45) Date of Patent: Mar. 31, 2009

(54) IMAGE PICKUP APPARATUS, CONTROL METHOD THEREOF, CONTROL PROGRAM THEREOF AND STORAGE MEDIUM, WITH MOVEMENT OF FOCUS LENS ON BASIS OF EVALUATION VALUES EXTRACTED BY LONG PERIOD SCAN UPON FAILURE OF DETECTION OF PEAK POSITION BY SHORT PERIOD SCAN

(75) Inventors: Hisao Yagi, Matsudo (JP); Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 11/053,929

(22) Filed: Feb. 10, 2005

(65) Prior Publication Data

US 2005/0179809 A1 Aug. 18, 2005

(30) Foreign Application Priority Data

Feb. 18, 2004 (JP) ............................. 2004-041409

(51) Int. Cl.
*G03B 13/00* (2006.01)
*H04N 5/232* (2006.01)

(52) U.S. Cl. ...................................... 348/356; 348/345

(58) Field of Classification Search ................. 348/345, 348/354

See application file for complete search history.

(56) References Cited

U.S. PATENT DOCUMENTS

| 5,623,706 A * | 4/1997 | Kosako ....................... 396/67 |
| 2002/0109784 A1* | 8/2002 | Suda et al. ................... 348/345 |
| 2003/0048372 A1* | 3/2003 | Yasuda ....................... 348/349 |
| 2003/0193600 A1* | 10/2003 | Kitamura et al. ........ 348/333.01 |

FOREIGN PATENT DOCUMENTS

JP 2002-318341 10/2002

* cited by examiner

*Primary Examiner*—Sinh N Tran
*Assistant Examiner*—Christopher K Peterson
(74) *Attorney, Agent, or Firm*—Fitzpatrick, Cella, Harper & Scinto

(57) ABSTRACT

Evaluation values are extracted at first timings with respect to a movement of a focus lens, and evaluation values are extracted at second timings having higher frequency than the first timings on the basis of the evaluation values extracted at the first timings. Then, even if the evaluation values have been extracted at the second timings in such a way, the focus lens is moved on the basis of the evaluation values extracted at the first timings. Thereby, the fast and suitable movement of AF can be implemented.

3 Claims, 7 Drawing Sheets

IMAGE PICKUP APPARATUS, CONTROL METHOD THEREOF, CONTROL PROGRAM THEREOF AND STORAGE MEDIUM, WITH MOVEMENT OF FOCUS LENS ON BASIS OF EVALUATION VALUES EXTRACTED BY LONG PERIOD SCAN UPON FAILURE OF DETECTION OF PEAK POSITION BY SHORT PERIOD SCAN

BACKGROUND OF THE INVENTION

1. Field of the Invention

The present invention relates to an image pickup apparatus equipped with an autofocus adjustment mechanism for automatically performing the focus adjustment of an image pickup lens by performing distance measurement up to an object, a control method of the image pickup apparatus, a control program of the image pickup apparatus, and a storage medium.

2. Related Background Art

As a conventional focus adjustment method, there is a known method named as a hill climbing method, by which a lens is moved toward a direction in which high frequency components of a luminance signal (hereinafter referred to as evaluation values) obtained from an image pickup element increase and then a lens position at which the evaluation values take the maximum value is regarded as a focused position. In the hill climbing method, as shown in FIG. 7, the midsection in a photographed picture of a camera is ordinarily set as a distance measurement area, and a lens position at which the evaluation values of the object in that area take the maximum value is regarded as the focused position. The relation between the lens positions and the evaluation values which are obtained in such a way takes a shape of a mountain, as shown in FIG. 4.

However, the hill climbing method has a defect such that a time necessary for focus adjustment becomes longer in proportion to the number of stopping positions of a focus lens. For example, in the case where an optical system having a long focal distance and a high magnification, the time necessary for the focus adjustment is strongly affected by the number of the stopping positions.

As means for settling such a problem, there is a method which has a plurality of patterns of obtaining periods of evaluation values in obtaining operations of the evaluation values (hereinafter referred to as scans) while using the above-mentioned hill climbing method. For example, a method (disclosed in, for example, Japanese Patent Application Laid-Open No. 2002-318341) is used in which, as shown in FIG. 4, a long period scan is first performed to specify, on the basis of the results thereof, a position of the focus lens at which the evaluation values take a peak in the long period scan (hereinafter referred to as a provisional focused position), and then a short period scan is performed in the vicinity of the provisional focused position to specify a final focused position.

On the other hand, in case of adopting the above-mentioned autofocus adjustment method of obtaining the focused position using the combination of the long period scan and the sort period scan, there is a case where, even if a lens position having a peak of the evaluation values has been able to be specified by the long period scan, a focused position cannot be specified by the short period scan in the vicinity of the peak. This case is, for example, one in which no peak of the evaluation values is suitably obtained since the object does not stay in the used distance measurement area owing to vibration or the like at the time of the short period scan.

Moreover, a method of setting the focus lens at a hyperfocal distance is known as a setting method of the focus lens in the case where distance measurement is judged to be impossible. In case of adopting this method, the photographing distance becomes the hyperfocal distance (the photographing distance=the hyperfocal distance). And then, the front side of the depth of field is at a position of ½ of the photographing distance, and the rear side of the depth of field includes up to infinity. Thus, focus is almost adjusted.

However, an image which can be obtained by performing photographing with the focus lens being focused at the hyperfocal distance has a feeling of a low resolution, and is an image which is impressed to be out of focus as the whole. Moreover, it is a matter of course that, when an object is located on the side nearer to the half of the hyperfocal distance in the case where the focus lens is positioned at the hyperfocal distance at the time of being out of focus, a photographed image becomes a defocused one. Consequently, an autofocus adjustment apparatus capable of obtaining an image having a resolution as high as possible even in the case where the focus lens is judged to be out of focus has been desired.

SUMMARY OF THE INVENTION

The present invention has been made in consideration of the above situation, and an object thereof is to provide an image pickup apparatus capable of obtaining an image having a resolution as high as possible even if the focus thereof is finally judged to be out of focus in case of adopting an autofocus adjustment method for obtaining a focused position by combining a long period scan and a short period scan, a control method of the image pickup apparatus, a control program of the image pickup apparatus, and a storage medium.

According to the present invention, the foregoing object is attained by providing an image pickup apparatus including an image pickup unit arranged to output an image signal correspondingly to an object image incident through a focus lens, and having at least two kinds of extraction timings for extracting evaluation values from the image signal to adjust focus with respect to movement of the focus lens, the image pickup apparatus comprising: an evaluation value obtaining unit arranged to extract the evaluation values at first timings with respect to the movement of the focus lens and extract the evaluation values at second timings having higher frequency than the first timings on the basis of the evaluation vales extracted at the first timings; and a control unit arranged to move the focus lens on the basis of the evaluation values extracted at the first timings even when the evaluation values are extracted at the second timings.

According to the present invention, the foregoing object is also attained by providing a control method for an image pickup apparatus which include an image pickup unit arranged to output an image signal correspondingly to an object image incident through a focus lens, and have at least two kinds of extraction timings for extracting evaluation values from the image signal to adjust focus with respect to movement of the focus lens, the method comprising the steps of: extracting the evaluation values at first timings with respect to the movement of the focus lens and extracting the evaluation values at second timings having higher frequency than the first timings on the basis of the evaluation vales extracted at the first timings; and moving the focus lens on the basis of the evaluation values extracted at the first timings even when the evaluation values are extracted at the second timings.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
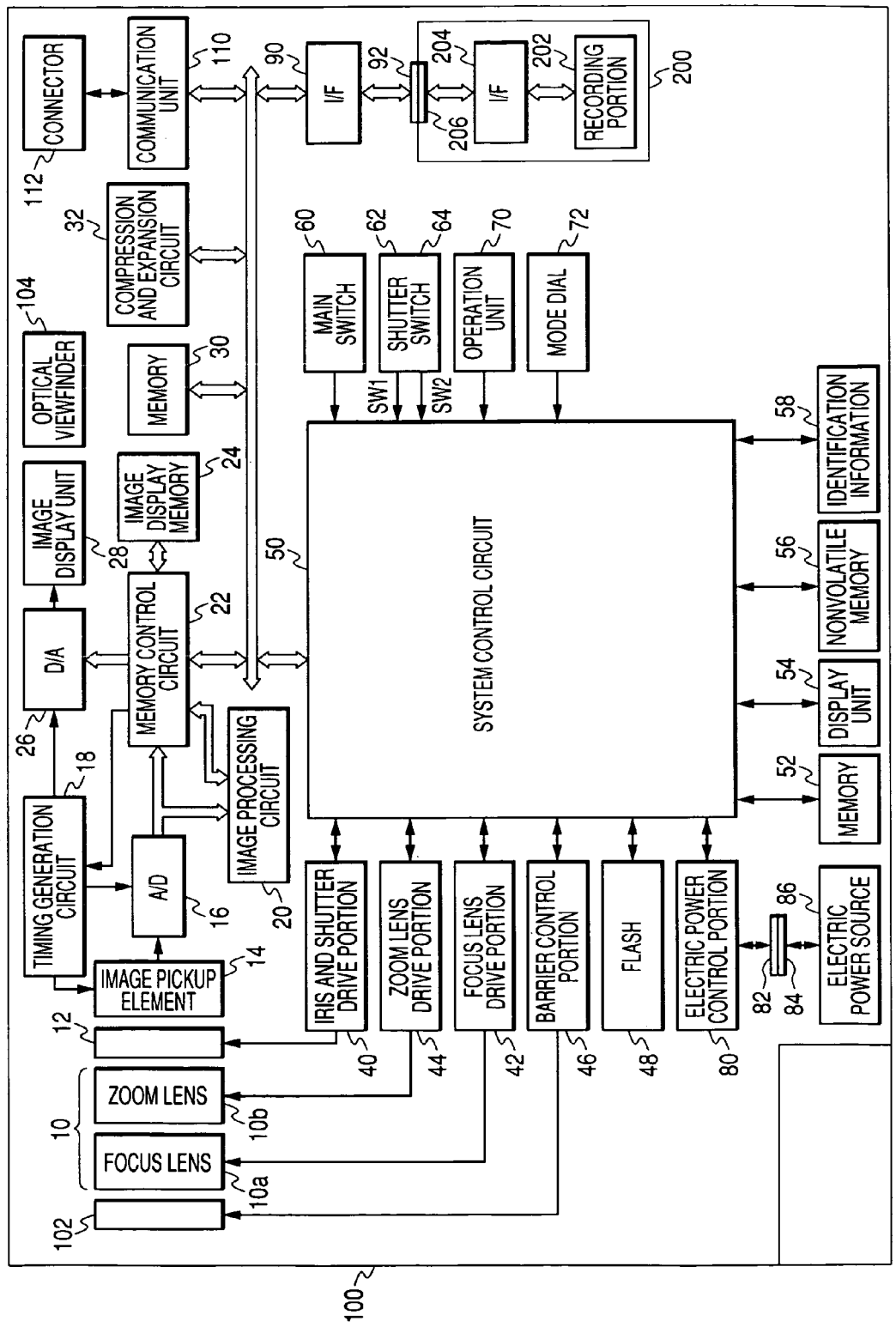
FIG. 1 is a block diagram showing the configuration of an image pickup apparatus according to a first embodiment of the present invention.

FIG. 1 is a block diagram showing the configuration of an image pickup apparatus according to a first embodiment of the present invention.

As shown in FIG. 1, the image pickup apparatus 100 includes a photographing lens 10 having a focus lens 10a and a zoom lens 10b, a shutter 12 having an iris function, an image pickup element 14 for converting an optical image into an electric signal, an A/D converter 16 for converting an analog signal output of the image pickup element 14 into a digital signal, a D/A converter 26 and an image processing circuit 20. A clock signal and a timing signal are supplied to the image pickup element 14, the A/D converter 16 and the D/A converter 26 from a timing generation circuit 18. The operation of the timing generation circuit 18 is controlled by a memory control circuit 22 and a system control circuit 50.

The image processing circuit 20 performs the predetermined pixel interpolation processing and the color conversion processing of the data from the A/D converter 16 or of the data from the memory control circuit 22. Moreover, the image processing circuit 20 performs predetermined operation processing using picked-up image data. On the basis of the results obtained by the operation processing, the system control circuit 50 performs the control of an iris and shutter drive portion 40 and a focus lens drive portion 42 to perform automatic focus (AF) processing by the through-the-lens (TTL) system, automatic exposure (AE) processing and pre-emission of flash (EF) processing. Moreover, the image processing circuit 20 performs predetermined operation processing using the picked-up image data. On the basis of obtained operation results, the image processing circuit 20 performs automatic white balance (AWB) processing by the TTL method.

The memory control circuit 22 controls the A/D converter 16, the timing generation circuit 18, the image processing circuit 20, an image display memory 24, the D/A converter 26, a memory 30 and a compression and expansion circuit 32. The data from the A/D converter 16 is written into the image display memory 24 or the memory 30 through the image processing circuit 20 and the memory control circuit 22, or the data from the A/D converter 16 is written into the image display memory 24 or the memory 30 directly through the memory control circuit 22.

The image data for display, which has been written into the image display memory 24, is displayed on an image display unit 28 through the D/A converter 26. The image display unit 28 consists of a liquid display apparatus of the TFT system. By sequentially displaying picked-up image data with the image display unit 28, it is possible to implement an electronic finder function. Moreover, the image display unit 28 can arbitrarily turn on and off the display thereof in accordance with an instruction from the system control circuit 50. In the case where the display is turned off, the power consumption of the image display apparatus 100 can be greatly reduced.

The memory 30 is a memory for storing photographed still images and moving images. The memory 30 has a storage capacity sufficient for storing a predetermined number of still images and a predetermined time period of moving images. Thereby, it becomes possible to perform the writing of extensive images into the memory 30 at a high speed even in the case of automatic photographing for continuously photographing a plurality of still images or in the case of panorama photographing. Moreover, the memory 30 provides a workspace for the system control circuit 50.

The compression and expansion circuit 32 is a circuit for compressing or expanding image data in accordance with adaptive discrete cosine transform coding (ADCT) or the like. The compression and expansion circuit 32 reads in an image stored in the memory 30 to perform the compression processing or the expansion processing of the read-in image. The data having been processed by the compression or the expansion is written in the memory 30.

The shutter 12 is controlled by the iris and shutter drive portion 40. The iris and shutter drive portion 40 has a flash light control function set to be in cooperation with a flash 48. Hereupon, the flash 48 includes a floodlight function of AF auxiliary light and the flash light control function.

The focus lens 10a of the photographing lens 10 is driven and controlled by the focus lens drive portion 42. The zoom lens 10b of the photographing lens 10 is driven and controlled by a zoom lens drive portion 44. Moreover, the photographing lens 10 is protected by protection means 102 being a barrier, and the operation of the protection means 102 is controlled by a barrier control portion 46.

The system control circuit 50 performs the control of the iris and shutter drive portion 40 and the focus lens drive portion 42 on the basis of the results of the operation of the picked-up image data by the image processing circuit 20 to control exposure and focus. Moreover, the system control circuit 50 controls the whole of the image pickup apparatus 100 on the basis of constants, variables and programs for operation, which are stored in a memory 52.

Operation states, messages and the like are displayed on a display unit 54 using texts, images and voices according to the execution of a program by the system control circuit 50. The display unit 54 includes a liquid crystal display apparatus, speakers and the like, and those are located at one or a plurality of positions, which are easily looked at, in the vicinity of an operation unit of the image processing apparatus 100. They consist of a combination of, for example, an LCD, LED's, sound producing elements and the like. Moreover, a part of the functions of the display unit 54 is provided to an optical viewfinder 104. As the display contents to be displayed on the LCD or the like among the display contents of the display unit 54, the following ones may be included: the display of single shot/continuous shot photographing, the display of a self-timer, the display of a compressibility, the display of the number of recording pixels, the display of the number of recorded images, the display of the number of residual photographable images, the display of a shutter speed, the display of an iris value, the display of exposure correction, the display of flash, the display of a relaxation of a red eye, the display of macro photographing, the display of buzzer setting, the display of the remaining level of a battery for a clock, the display of the remaining level of a battery, the display of an error, the display of information by means of a numeral consisting of a plurality of digits, the display of the attachment state of a recording medium 200, the display of a communication I/F operation, the display of a date and a time, and the like. Moreover, as the display contents to be displayed in the optical viewfinder 104 among the display contents of the display unit 54, the following ones may be included: the display of a focused state, the display of vibration warning, the display of flash charging, the display of a shutter speed, the display of an iris value, the display of exposure correction, and the like.

To the system control circuit 50, an electrically erasable and recordable nonvolatile memory 56 consisting of, for example, an EEPROM, a plurality of operation means for inputting various operation instructions to the system control circuit 50, an electric power control portion 80 and a communication unit 110 are connected.

The plurality of operation means consists of a combination of one or a plurality of switches, dials, a touch panel, pointing by the detection of a viewpoint, a voice recognition apparatus and the like. As the plurality of operation means, a main switch 60, a shutter switch (SW1) 62, a shutter switch (SW2) 64, an operation unit 70, a mode dial 72 and the like may be included.

The main switch 60 is a switch for switching over and setting of each of the mode of turning on the power source of the image pickup apparatus 100 and the mode of turning off the power source of the image pickup apparatus 100. Moreover, it is also possible to set the turning on and the turning off of the power sources of various attachment apparatus connected to the image pickup apparatus 100.

The shutter switch (SW1) 62 turns on in the middle of an operation of a shutter button (not shown), and instructs the starts of the operations of the autofocus (AF) processing, the autoexposure (AE) processing, the auto white balance (AWB) processing, the pre-emission of flash (EF) processing, and the like. The shutter switch (SW2) 64 turns on at the time of the completion of the operation of the shutter button, and instructs the start of the operation of a series of processing composed of exposure processing for writing a signal read out from the image pickup element 14 into the memory 30 through the A/D converter 16 and the memory control circuit 22 as image data, development processing using operations in the image processing circuit 20 and the memory control circuit 22, and recording processing for reading out image data from the memory 30 and performing the compression of the read-out image data in the compression and expansion circuit 32 to write the compressed image data onto the recording medium 200.

The operation unit 70 consists of various buttons, a touch panel and the like, and includes a menu button, a set button, a macro button, a multi picture reproduction and page break button, a flash setting button, a single shot/continuous shot/self timer switching button, a menu movement+ button, a menu movement− button, a reproduced image moving+ button, a reproduced image moving− button, a photographing image quality selection button, an exposure correction button, a date/time setting button, image display ON/OFF button, a compression mode switch, a quick review switch, a selection/switching switch, a decision/execution switch and the like.

The quick review switch is a switch for setting a quick review function of automatically reproducing and displaying photographed image data by means of the image display unit 28 immediately after the photographing. The selection/switching switch is a switch for setting of the selection and the switching of various functions at the time of executing photographing, reproducing or communication. The decision/execution switch is a switch for setting the decision and the execution of the various functions at the time of executing the photographing, the reproducing or the communication.

The compression mode switch is a switch for selecting a compressibility of the Joint Photographic Expert Group (JPEG) compression, or for selecting a CCDRAW mode for digitizing a signal of the image pickup element 14 as it is to record the digitized signal into the recording medium 200. As the modes of the JPEG compression, for example, a normal mode and a fine mode are prepared. Thereby, a user of the image pickup apparatus 100 can select the normal mode in the case where the user puts a high priority on the data size of a photographed image, or can select the fine mode in the case where the user puts a high priority on the image quality of the photographed image, thereby performing photographing.

In the modes of the JPEG compression, image data, which has been read out from the image pickup element 14 and written in the memory 30 through the A/D converter 16, the image processing circuit 20 and the memory control circuit 22, is read out to be compressed at the compressibility set by the compression and expansion circuit 32 to record the image data onto the recording medium 200.

In the CCDRAW mode, image data, which has been read out on a line to line basis as it is according to the pixel arrangements of the color filter of the image pickup element 14 and has been written in the memory 30 through the A/D converter 16 and the memory control circuit 22, is read out to be recorded on the recording medium 200.

The mode dial 72 is a switch for switching and setting the various function modes such as power source turning-off mode, an automatic photographing mode, a photographing mode, a panorama photographing mode, a reproduction mode, a multi picture reproduction and erase mode, and a PC connecting mode. Incidentally, the image pickup apparatus 100 of the present embodiment is especially adapted to be provided with the photographing mode, the reproduction mode and a print service mode.

The electric power control portion 80 consists of a battery detection circuit, a DC-DC converter, a switch circuit for switching a block to be electrically powered, and the like. The electric power control portion 80 performs the detection of the attachment and detachment of a battery, the kind of the battery and the residual level of the battery. The electric power control portion 80 controls the DC-DC converter on the basis of the results of the detection and the instructions of the system control circuit 50 to supply a necessary voltage to each block including the recording medium for a necessary period. To the electric power control portion 80, electric power is supplied from an electric power source 86 through connectors 82 and 84. The electric power source 86 consists of a primary battery such as an alkaline battery and a lithium battery, a secondary battery such as a NiCd battery, NiMH battery and a Li battery, or an AC adapter.

The recording medium 200 each consists of a recording medium'such as a memory card and a hard disc, and includes a recording portion 202 and a connector 206. The connector 206 is connected to a connecter 92. The connecter 92 is connected to an I/F 90.

The communication unit 110 includes various communication functions such as RS 232C, USB, IEEE 1394, P 1284, SCSI, a modem, a LAN, a wireless communication and the like. The communication unit 110 is provided with a connector 112 for connecting the image pickup apparatus 100 to another apparatus such as a printer. Moreover, in case of the wireless communication, an antenna is provided in place of the connector 112.

Figure 2:
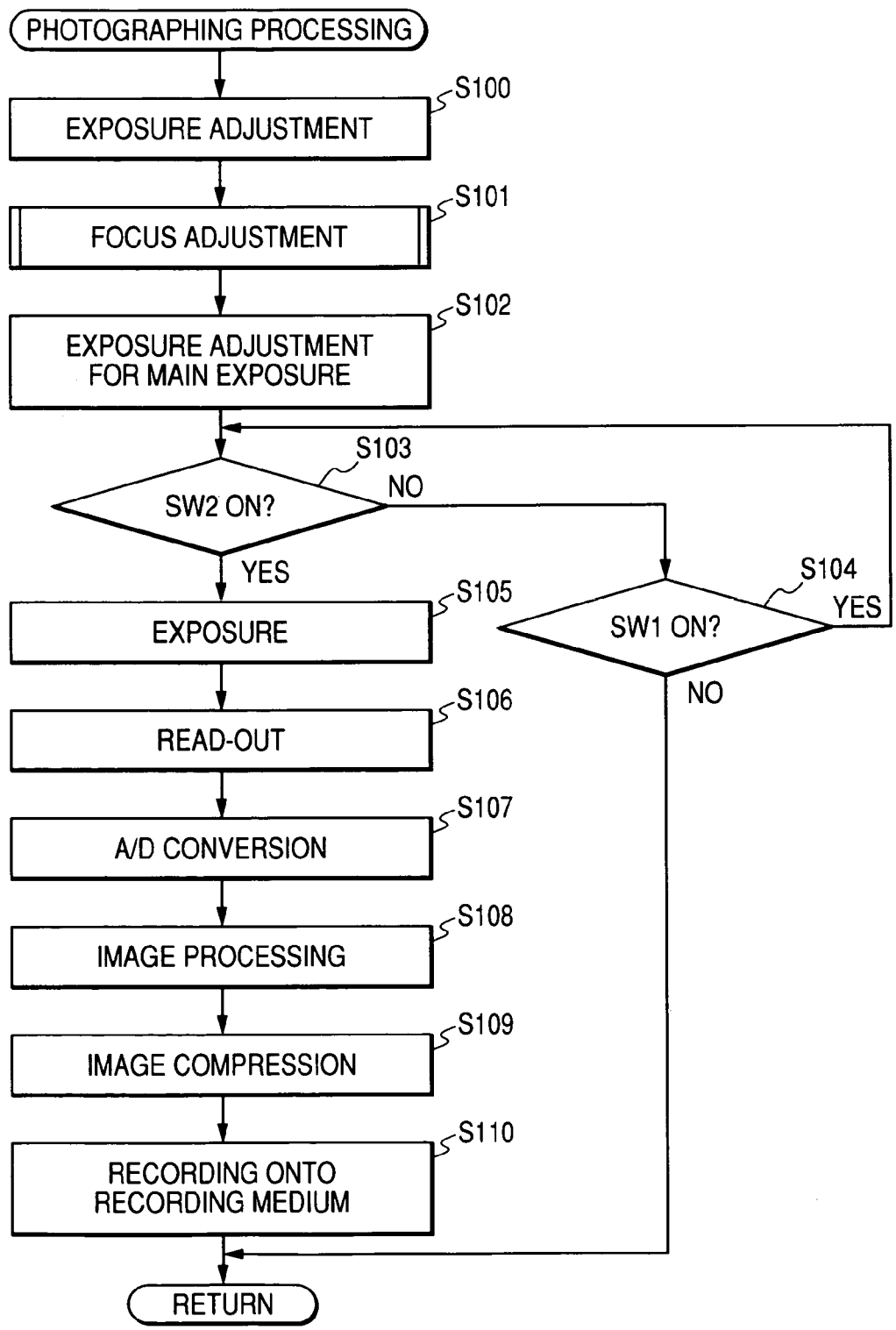
FIG. 2 is a flowchart showing a procedure of the image pickup processing of the image pickup apparatus of FIG. 1.
Figure 3:
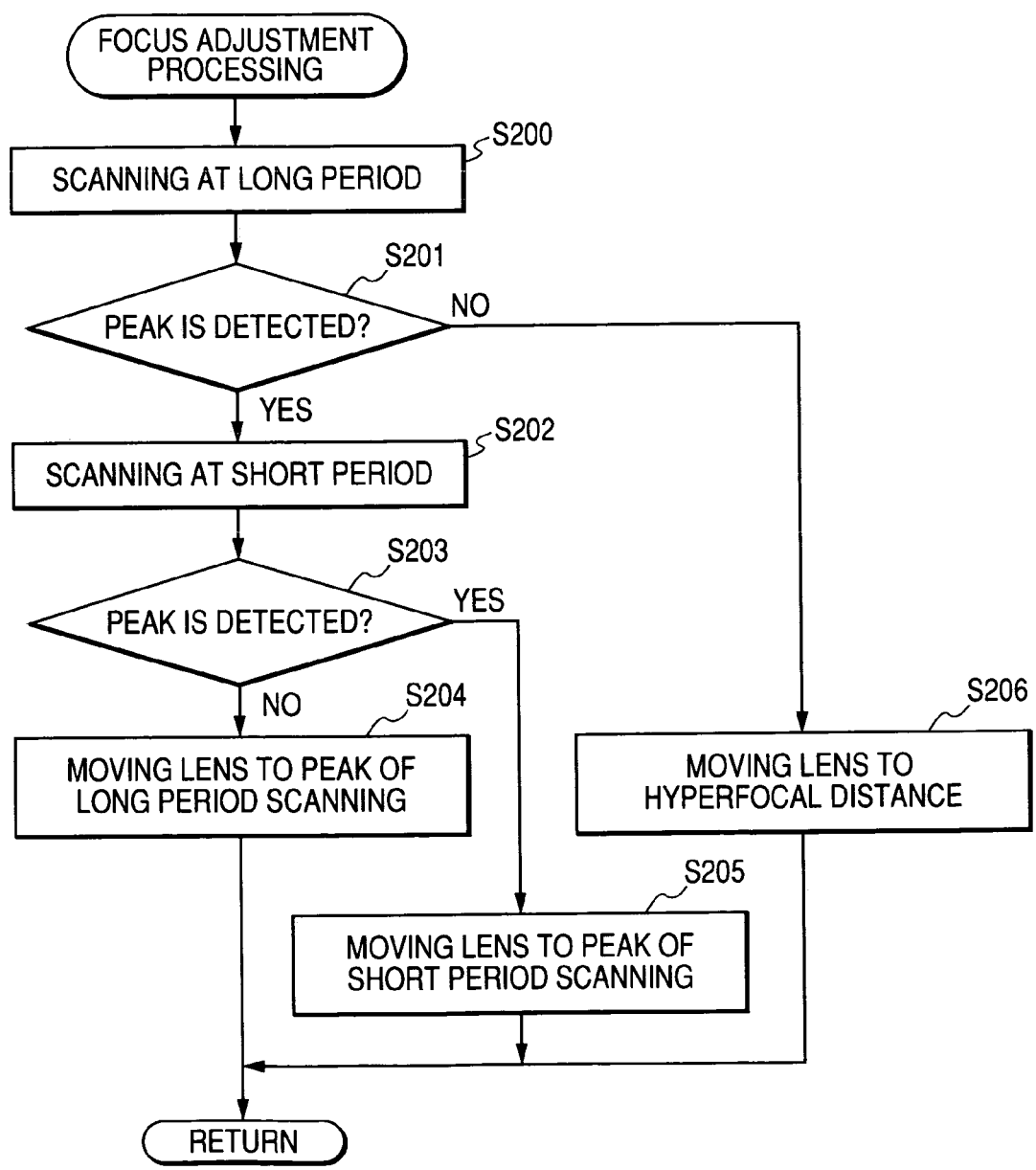
FIG. 3 is a flowchart showing the procedure of the focus adjustment processing at Step S101 of FIG. 2.
Figure 4:
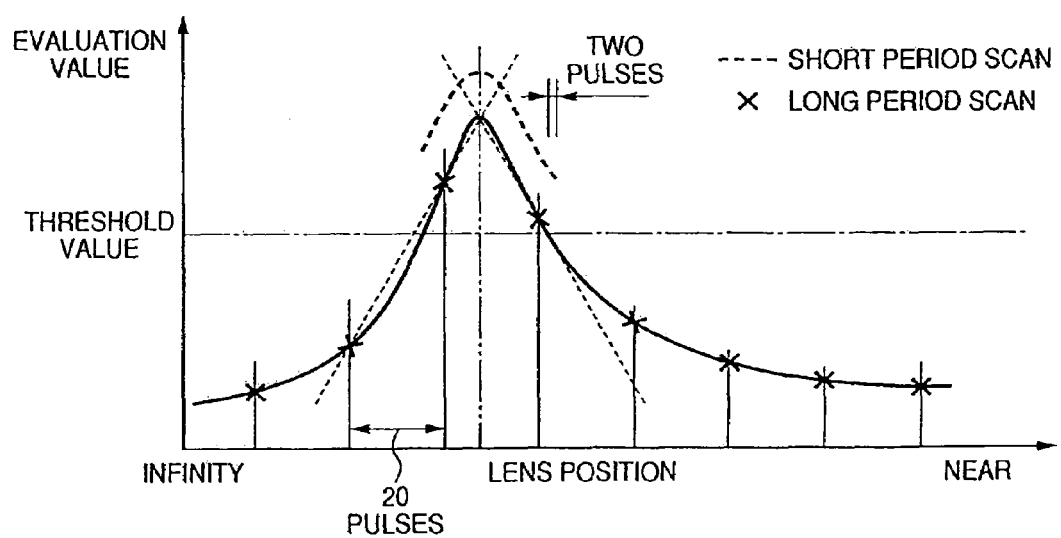
FIG. 4 is a view showing an example of evaluation values changing according to the movement of a focus lens (in case of high contrast)
Figure 5:
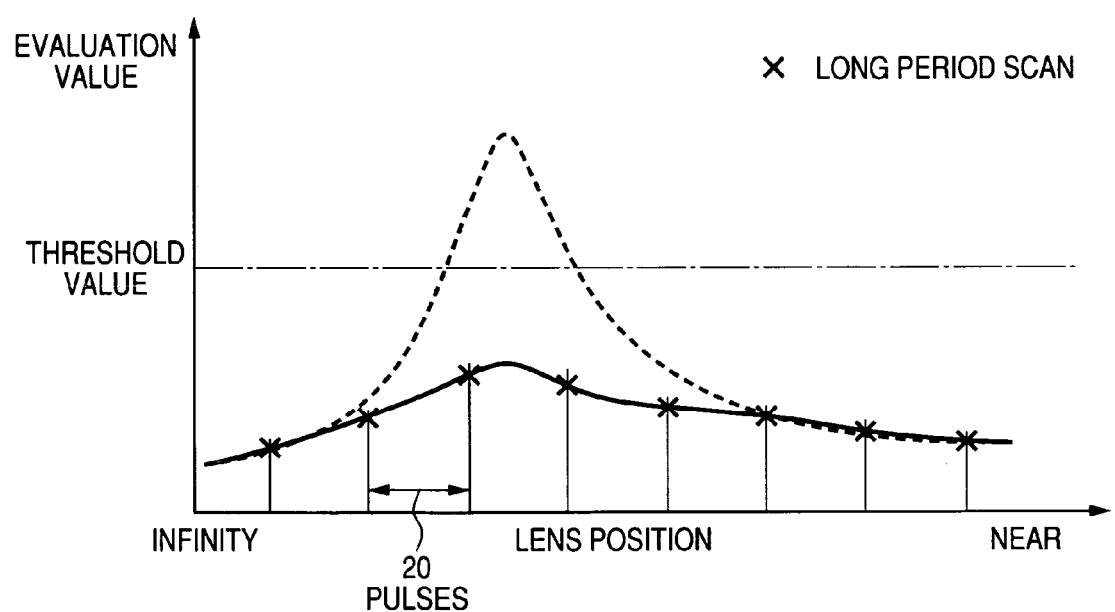
FIG. 5 is a view showing an example of evaluation values changing according to the movement of a focus lens (in case of low contrast)
Figure 6:
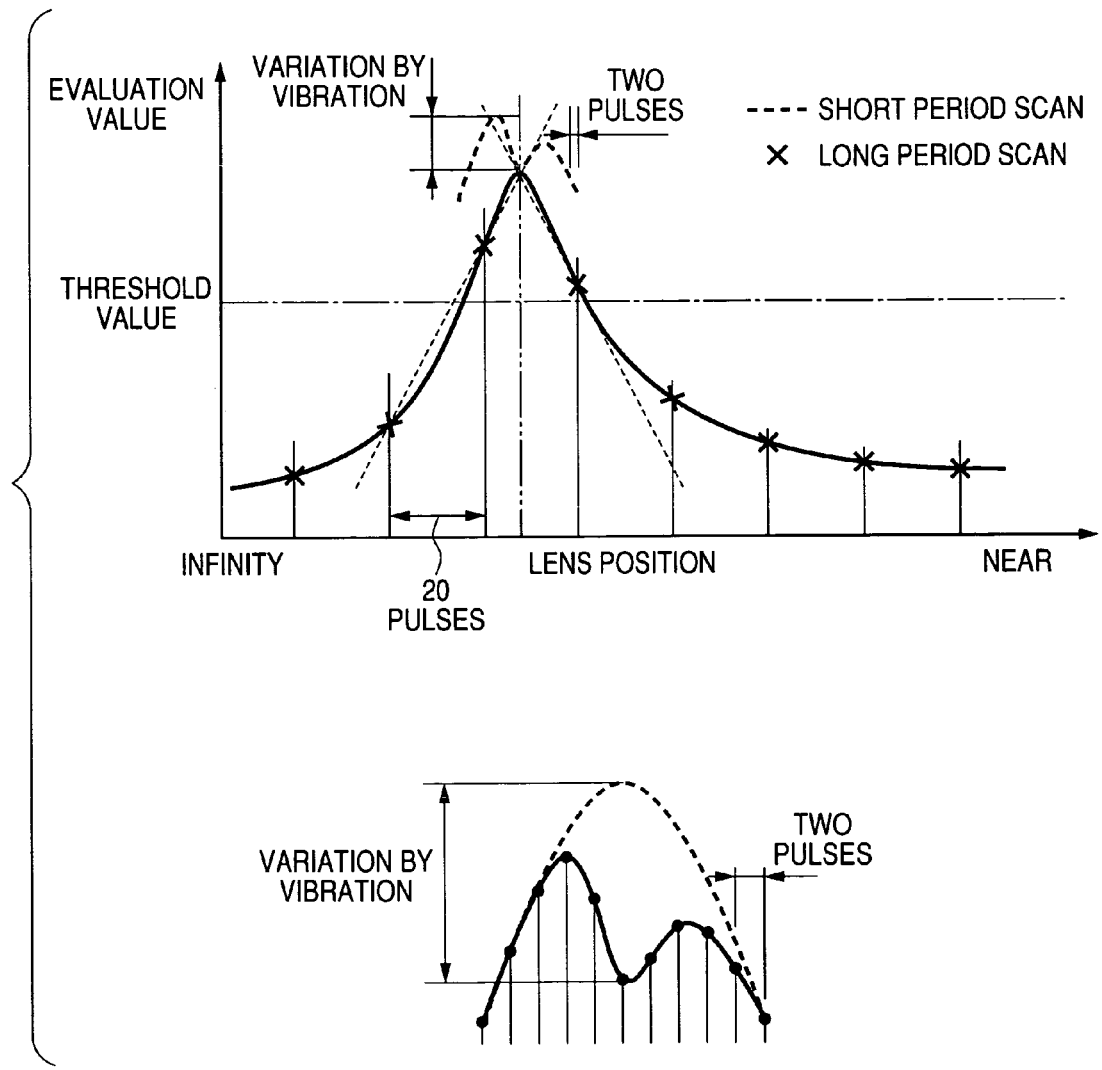
FIG. 6 is a view showing an example of evaluation values changing according to the movement of a focus lens (in case of the occurrence of vibrations at the time of a short period scan)
Figure 7:
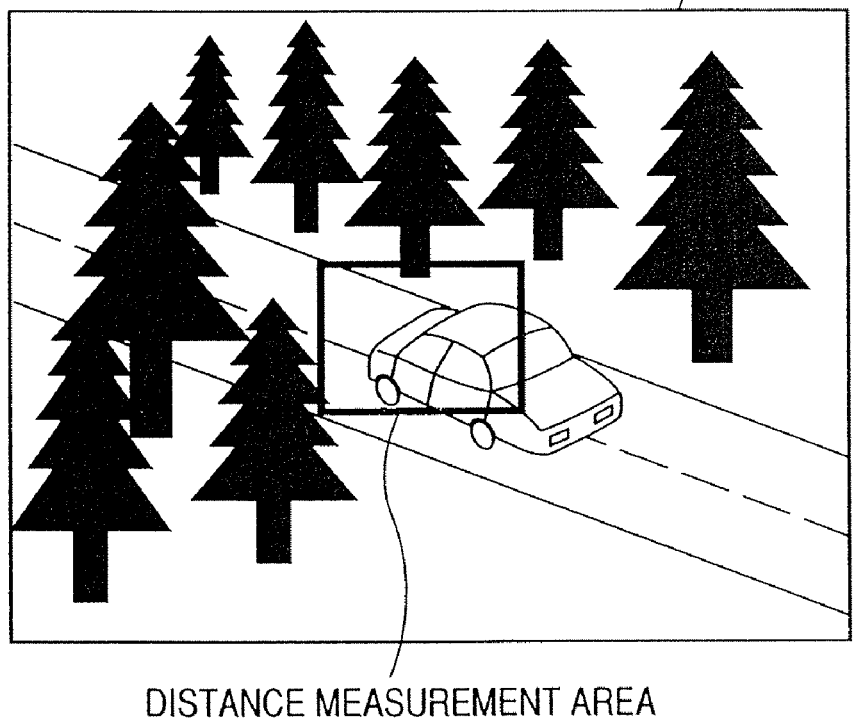
FIG. 7 is a view showing a positional relationship between a photographed picture of a camera and a distance measurement area at the midsection thereof.

Next, while referring to FIGS. 2 to 6, the operation of the image pickup apparatus 100 of the present embodiment is described in detail. FIG. 2 is a flowchart showing a procedure of the photographing processing of the image pickup apparatus 100 of FIG. 1. FIG. 3 is a flowchart showing a procedure of the focus adjustment processing at Step S101 of FIG. 2. FIG. 4 is a view showing an example of evaluation values changing as the focus lens moves (at the time of high contrast). FIG. 5 is a view showing an example of evaluation values changing as the focus lens moves (at the time of low contrast). FIG. 6 is a view showing an example of evaluation values changing as the focus lens moves (e.g. in the case where vibrations occur at the time of a short period scan). Hereupon, the procedures shown in FIGS. 2 and 3 are executed by the system control circuit 50 on the basis of the constants, the variables and the programs for operation, which are stored in the memory 52.

In a photographing operation of the image pickup apparatus 100, when the shutter switch SW1 (62) is turned on, the photographing processing shown in FIG. 2 is executed by the system control circuit 50. In the photographing processing, fist at Step S100, the system control circuit 50 performs exposure adjustment before focus adjustment. At successive Step S101, the system control circuit 50 executes the focus adjustment processing. The details of the focus adjustment processing will be described later. After the completion of the focus adjustment processing, the system control circuit 50 performs exposure adjustment for main exposure so as to attain exposure suitable for photographing at Step S102.

Next, at Step S103, the system control circuit 50 judges whether or not the shutter switch SW2 (64) is on. When the shutter switch SW2 is not on, namely the shutter switch SW2 is off, at this time, the system control circuit 50 judges whether or not the shutter switch SW1 (62) is on at Step S104. When the shutter switch SW1 (62) is on, the system control circuit 50 returns its processing to Step S103. On the other hand, when the shutter switch SW1 (62) is off, the system control circuit ends the photographing processing. Consequently, unless the condition such that the shutter switch SW1 (62) is on and the shutter switch SW2 (64) is on is satisfied, the processing at and after Step S103 is not executed.

In the case where the shutter switch SW2 (64) is judged to be on at Step S103, the system control circuit 50 performs the exposure to the image pickup element 14 at Step S105, and reads out the data stored in the image pickup element 14 at successive Step S106. Then, the system control circuit 50 converts the analog signal read out from the image pickup element 14 into a digital signal, or image data, with the A/D converter 16 at Step S107.

Next, at Step S108, the system control circuit 50 performs various kinds of image processing of the image data from the A/D converter 16 with the image processing circuit 20. Successively, at Step S109, the system control circuit 50 compresses the image data which has been subjected to the various kinds of image processing at Step S108, in accordance with a format such as the JPEG with the compression and expansion circuit 32. Then, at Step S110, the system control circuit 50 transfers the image data compressed at Step S109 to the recording medium 200 through the I/F 90 to record the transferred image data thereon.

In the focus adjustment processing at Step S101, as shown in FIG. 3, the system control circuit 50 first performs scanning for obtaining evaluation values at a long period to obtain a provisional focused position at Step S200. In this case, for example, as shown in FIG. 4, the scan is performed at a period of lens positions corresponding to 20 pulses of driving pulses of the focus lens 10a to obtain the evaluation values. Then, in the case where the levels of the evaluation values exceed a predetermined threshold value and a detection condition of a peak of the evaluation values is satisfied, an interpolation calculation is performed by using several evaluation values having higher levels among the evaluation values exceeding the threshold value to obtain a point corresponding to the peak of the evaluation values, that is, a lens position, is obtained. The lens position obtained by the interpolation calculation is a position to be presumed to be the lens position at the time of being focused, that is, the above-mentioned provisional focused position. In the example shown in FIG. 4, a case in which three evaluation values are used for the interpolation calculation is shown for simplification. However, many methods have been already known as a method of general interpolation calculation, and it is possible to select a suitable method according to constrained conditions such as the system to be implemented and the properties of the apparatus.

Next, at Step S201, the system control circuit 50 judges whether or not the provisional focused position has been specified by the long period scan. Hereupon, in the case where the provisional focused position could not been specified by the long period scan, namely as shown in FIG. 5, in the case where the contrast of the image is low and the reliability of the provisional focused position calculated on the basis of the obtained evaluation values is low, the system control circuit 50 controls the focus lens drive portion 42 so that the focus lens 10a moves to a hyperfocal distance position at Step S206. That is to say, the control of focusing roughly is performed. Then, the system control circuit 50 exits the present processing.

In the case where it is judged that the provisional focused position can be specified at Step S201, the system control circuit 50 performs a scan for obtaining evaluation values at a short period at Step S202. The system control circuit 50 calculates a final lens position at the focus state (hereinafter referred to as a focused position) on the basis of the evaluation values obtained by the short period scan. In this case, for example, as shown in FIG. 4, the scan is performed at a period of lens positions corresponding to two pulses of the driving pulses of the focus lens 10a to obtain the evaluation values.

Next, at Step S203, the system control circuit 50 judges whether or not the focused position has been detected. In the case where the detection of the focused position is successful, at Step S204, the system control circuit 50 controls the focus lens drive portion 42 so that the focus lens 10a moves to the focused position calculated at Step S203. Then, the system control circuit 50 ends the present processing.

As the case where the focused position is not detected at Step S203, for example as shown in FIG. 6, a case where normal evaluation values are not obtained owing to influences such as vibrations at the time of the short period scan even if a provisional focused position can be specified by the long period scan, may be considered. To put it concretely, such a case is (a) one in which a plurality of peaks exists in a short period scan, or (b) one in which the amount of changes (the difference between the maximum value and the minimum value) larger than a predetermined amount in the short period scan does not exist. As for the case (a), vibrations and noises can be supposed when a plurality of peaks exists. As for the case (b), no peaks are judged to exist when the amount of changes larger than the predetermined amount does not exist. In such cases, at Step S 204, the system control circuit 50 controls the focus lens drive portion 42 so that the focus lens 10a moves to the provisional focused position calculated at Step S200, and ends the present processing.

As described above, according to the present embodiment, it is possible to obtain an image having a resolution as high as possible even in case of being finally judged to be unfocused in case of adopting autofocus adjustment method for obtaining a focused position by combining a long period scan and a short period scan.

Incidentally, in the embodiment described above, the case (a), in which a plurality of peaks exists in the short period scan, and the case (b), in which the amount of changes (the difference between the maximum value and the minimum value) larger than a predetermined amount in the short period scan does not exist, are shown as the concrete examples of the case where normal evaluation values cannot been obtained owing to influences such as vibrations at the time of the short period scan even if a provisional focused position could been specified by the long period scan. However, for example, in a case (c) in which the level of a peak value of the evaluation values obtained by a short period scan is lower than the levels of the evaluation values obtained by a long period scan, the levels of the evaluation values obtained by the long period scan may be adopted.

The present invention is not limited to be applied to the apparatus of the embodiment described above, but the present invention may be applied to a system consisting of a plurality of pieces of equipment, or may be applied to an apparatus consisting of one piece of equipment.

Moreover, it is needless to say that the object of the present invention can be attained by providing a storage medium (or a recording medium) in which the program codes of the software implementing the above-mentioned functions of the embodiment to a system or an apparatus for the computer (or the CPU or the MPU) of the system or the apparatus to read out the program codes stored on the storage medium to execute them. In this case, the program codes read out from the storage medium themselves implement the above-mentioned functions of the embodiment, and then the storage medium storing the program codes constitutes the present invention.

Moreover, as the storage medium for supplying the program codes, for example, the following media may be used: a floppy (registered trade mark) disc, a hard disc, a magneto-optical disc, a CD-ROM, a CD-R, a CD-RW, a DVD-ROM, a DVD-RAM, a DVD-RW, a DVD+RW, a magnetic tape, a nonvolatile memory card, a ROM or the like. Alternatively, the program codes may be down-loaded through a network.

Moreover, it is needless to say that not only the above-mentioned functions of the embodiment are implemented by the execution of the program codes read out by a computer, but also the case where an operating system (OS) or the like which works on the computer performs a part of or the whole of the actual processing on the basis of the instructions of the program codes to implement the above-mentioned functions of the embodiment by the processing is included in the present invention.

Moreover, it is needless to say that the case where the program codes read out from a storage medium are written in a memory mounted on a function enhancement card inserted into a computer or a function enhancement unit connected to the computer before the CPU or the like which is equipped in the function enhancement card or the function enhancement unit performs a part of or the whole of the actual processing on the basis of the instructions of the program codes to implement the above-mentioned functions of the embodiment by the processing.

This application claims priority from Japanese Patent Application No. 2004-041409 filed on Feb. 18, 2004, which is hereby incorporated by reference herein.

What is claimed is:

1. An image pickup apparatus including an image pickup unit arranged to output an image signal correspondingly to an object image incident through a focus lens, and having at least two scans of different periods for extracting evaluation values from the image signal to adjust focus with respect to movement of said focus lens, said image pickup apparatus comprising:

an evaluation value obtaining unit, arranged to extract the evaluation values by a long period scan of the at least two scans with respect to the movement of said focus lens and extract the evaluation values by a short period scan of the at least two scans on the basis of the evaluation vales extracted by the long period scan; and a control unit, arranged to move the focus lens on the basis of a peak position detected from the evaluation values extracted by the long period scan if said control unit fails to detect a peak position by the short period scan in a case where the peak position is detected in the long period scan and the evaluation values are extracted by the short period scan.

2. An image pickup apparatus according to claim 1, wherein said control unit moves the focus lens to a hyperfocal distance if the peak position cannot be detected by the long period scan.

3. A control method for an image pickup apparatus including an image pickup unit arranged to output an image signal correspondingly to an object image incident through a focus lens, and having at least two scans of different periods kinds of extraction timings for extracting evaluation values from the image signal to adjust focus with respect to movement of said focus lens, said method comprising the steps of:

extracting the evaluation values by a long period scan of the at least two scans with respect to the movement of said focus lens and extract the evaluation values by a short period scan of the at least two scans on the basis of the evaluation vales extracted by the long period scan; and controlling to move the focus lens on the basis of a peak position detected from the evaluation values extracted by the long period scan if said controlling step fails to detect a peak position by the short period scan even in a case where the peak position is detected in the long period scan and the evaluation values are extracted by the short period scan.

* * * * *